United States Patent [19]
Barrett, Jr. et al.

[11] Patent Number: 6,021,261

[45] Date of Patent: Feb. 1, 2000

[54] METHOD AND SYSTEM FOR TESTING A MULTIPROCESSOR DATA PROCESSING SYSTEM UTILIZING A PLURALITY OF EVENT TRACERS

[75] Inventors: Archie Don Barrett, Jr., Leander; Sriram Srinivasan Mandyam, Austin; Brian Walter O'Krafka, Austin; Brett Adam St. Onge, Austin; Robert James Ramirez, New Braunfels, all of Tex.

[73] Assignee: International Business Machines Corporation, Armonk, N.Y.

[21] Appl. No.: 08/760,497

[22] Filed: Dec. 5, 1996

[51] Int. Cl.[7] .................................................. G06F 11/00
[52] U.S. Cl. ......................................................... 395/183.13
[58] Field of Search ........................ 395/183.13, 183.15, 395/184.01, 568, 704, 183.21; 364/148, 149, 221.2, 221.7, 267, 267.8, 550, 551.01, 916.3

[56] References Cited

U.S. PATENT DOCUMENTS

| | | | |
|---|---|---|---|
| 3,814,919 | 6/1974 | Repton et al. ............................ | 235/153 |
| 3,879,712 | 4/1975 | Edge et al. ............................ | 340/172.5 |
| 4,397,021 | 8/1983 | Lloyd et al. ............................... | 371/20 |
| 4,802,164 | 1/1989 | Fukuoka et al. ............................ | 371/16 |
| 4,991,090 | 2/1991 | Emma et al. ............................ | 364/200 |
| 5,025,365 | 6/1991 | Mathur et al. ............................ | 364/200 |
| 5,067,071 | 11/1991 | Schanin et al. ......................... | 395/275 |
| 5,136,700 | 8/1992 | Thacker ................................... | 395/400 |
| 5,249,268 | 9/1993 | Doucet .................................... | 395/200 |
| 5,317,726 | 5/1994 | Horst ....................................... | 395/575 |
| 5,345,578 | 9/1994 | Manasse .................................. | 395/425 |
| 5,355,471 | 10/1994 | Weight .................................... | 395/575 |
| 5,394,555 | 2/1995 | Hunter et al. ............................ | 395/800 |
| 5,446,876 | 8/1995 | Levine et al. ....................... | 395/184.01 |
| 5,450,349 | 9/1995 | Brown, III et al. ................ | 395/183.03 |
| 5,491,793 | 2/1996 | Somasundaram et al. ......... | 395/183.21 |
| 5,692,153 | 11/1997 | Malik et al. ............................ | 395/468 |
| 5,726,913 | 3/1998 | Grimsrud .......................... | 364/551.01 |
| 5,764,885 | 6/1998 | Sites et al. ......................... | 395/183.21 |
| 5,802,272 | 9/1998 | Sites et al. ......................... | 395/183.21 |

*Primary Examiner*—Robert W. Beausoliel, Jr.
*Assistant Examiner*—Stephen C. Elmore
*Attorney, Agent, or Firm*—Richard A. Henkler; Lisa B. Yociss; Andrew J. Dillon

[57] ABSTRACT

A multiprocessor data processing system includes a shared main memory and a plurality of processors connected to the memory utilizing a system bus. Data is transferred utilizing the system bus. The plurality of processors include a first processor and a second processor. The first processor includes a first cache, and the second processor includes a second cache. The multiprocessor data processing system executes a test program. During execution of the test program, a first and a second trace are generated. The first trace is generated by monitoring all events occurring at a first location within the system. The second trace is generated by monitoring all events occurring at a second location within the system. Each event is associated with a time of occurrence of that event. The first trace includes each event which was monitored at the first location and the time associated with each event. The second trace includes each event which was monitored at the second location and the time associated with each event. The first and second traces are stored and utilized to determine if the multiprocessor data processing system is operating correctly.

14 Claims, 12 Drawing Sheets

METHOD AND SYSTEM FOR TESTING A MULTIPROCESSOR DATA PROCESSING SYSTEM UTILIZING A PLURALITY OF EVENT TRACERS

BACKGROUND OF THE INVENTION

1. Technical Field

The present invention relates to a method and system within a multiprocessor data processing system for testing the multiprocessor system, and in particular to generating a first and a second trace within the multiprocessing system during execution of a test program. Still more particularly, the present invention relates to a method and system for testing the system by, during execution of a test program, generating a first and a second trace within the system, where the first trace is generated by monitoring all events occurring at a first location and the second trace is generated by monitoring all events occurring at a second location.

2. Description of the Related Art

A multiprocessor data processing systems may include a plurality of processors and a shared main memory, where each processor includes its own cache. In such a multiprocessor system, maintaining cache coherency and consistency is important.

The term "coherency" refers to the ordering of competing storage access events from different processors. Competing storage access events are those events that attempt to store information into the same location. The term "consistency" refers to the ordering of all storage access events within a single processor.

Verifying that the multiprocessor system maintains cache coherency and consistency must be done as these multiprocessor data processing systems are designed. Verification is typically done by providing a testing device. The testing device compares the results obtained after execution of a test program within a particular model of the system under test with predicted results.

One testing device provides a functional simulator and comparator. The test program is applied to the functional simulator of the testing device which generates predicted results. The test program in this case is executed by to a simulator which simulates the model under test. Once the simulator, acting as the model under test, has completed execution of the test program, the testing device obtains the results of the test which are the values stored in registers, cache, and main memory within the testing device simulator. The predicted results include the values predicted to be stored in registers, cache, and memory for the model. The predicted results are compared to the actual results. This testing device is restricted to a comparison of values available only at the end of the processing of the test program. Interim values stored in registers, cache, and main memory are lost. As a result, storage access ordering of events and errors caused by race conditions which are due to competing accesses are not determined by the test device. In addition, the test program is restricted to performing stores only to non-overlapping bytes. This testing device may be used with a variety of multiprocessor systems and may be less expensive to implement. However, because of the limitations of this test device described above, a large number of errors may go undetected.

Another method is to provide a testing device which is functionally equivalent to the model under test. The state of the model under test is matched by the state of the testing device at all times during the test. A comparison is made between the states of the testing device and the states of the model. However, it is not often practical to provide such a testing device for each model which is to be tested. A testing device designed for one particular model could not be used for a different model. The design of the model may change frequently, thus causing increased time and cost in order to develop to a testing device for each model design. Although this test device is very accurate for a particular multiprocessor system, it cannot be used on a variety of systems. It is limited to the particular system for which it is designed. Therefore, when testing a variety of systems or different implementations of the same design, this testing device may be prohibitively costly and time consuming.

Therefore a need exists for a cost effective method and system for testing multiprocessor systems which may be quickly customized for a variety multiprocessor systems.

SUMMARY OF THE INVENTION

It is therefore one object of the present invention to provide a method and system within a multiprocessor data processing system for testing the multiprocessor system.

It is another object of the present invention to provide a method and system within a multiprocessor data processing system for testing the multiprocessor system by generating a first and a second trace within the multiprocessing system during execution of a test program.

It is yet another object of the present invention to provide a method and system for testing a multiprocessor data processing system by, during execution of a test program, generating a first and a second trace within the system, where the first trace is generated by monitoring all events occurring at a first location and the second trace is generated by monitoring all events occurring at a second location.

The foregoing objects are achieved as is now described. A method and system are disclosed for testing a multiprocessor data processing system. The multiprocessor data processing system includes a shared main memory and a plurality of processors connected to the memory utilizing a system bus. Data is transferred utilizing the system bus. The plurality of processors include a first processor and a second processor. The first processor includes a first cache, and the second processor includes a second cache. The multiprocessor data processing system executes a test program. During execution of the test program, a first and a second trace are generated. The first trace is generated by monitoring all events occurring at a first location within the system. The second trace is generated by monitoring all events occurring at a second location within the system. Each event is associated with a time of occurrence of that event. The first trace includes each event which was monitored at the first location and the time associated with each event. The second trace includes each event which was monitored at the second location and the time associated with each event. The first and second traces are stored and utilized to determine if the multiprocessor data processing system is operating correctly.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4a–4c are high level flow charts depicting the creation of a list of a sequence of events in accordance with the method and system of the present invention;

FIGS. 8a and 8b together are a high level flow chart depicting check of loads, stores, reads, and writes within multiprocessor system 8 in accordance with the present invention.

DETAILED DESCRIPTION OF PREFERRED EMBODIMENT

An exemplary embodiment of the present invention and its advantages are better understood by referring to FIGS. 1–9 of the drawings, like numerals being used for like and corresponding parts of the accompanying drawings.

Figure 1:
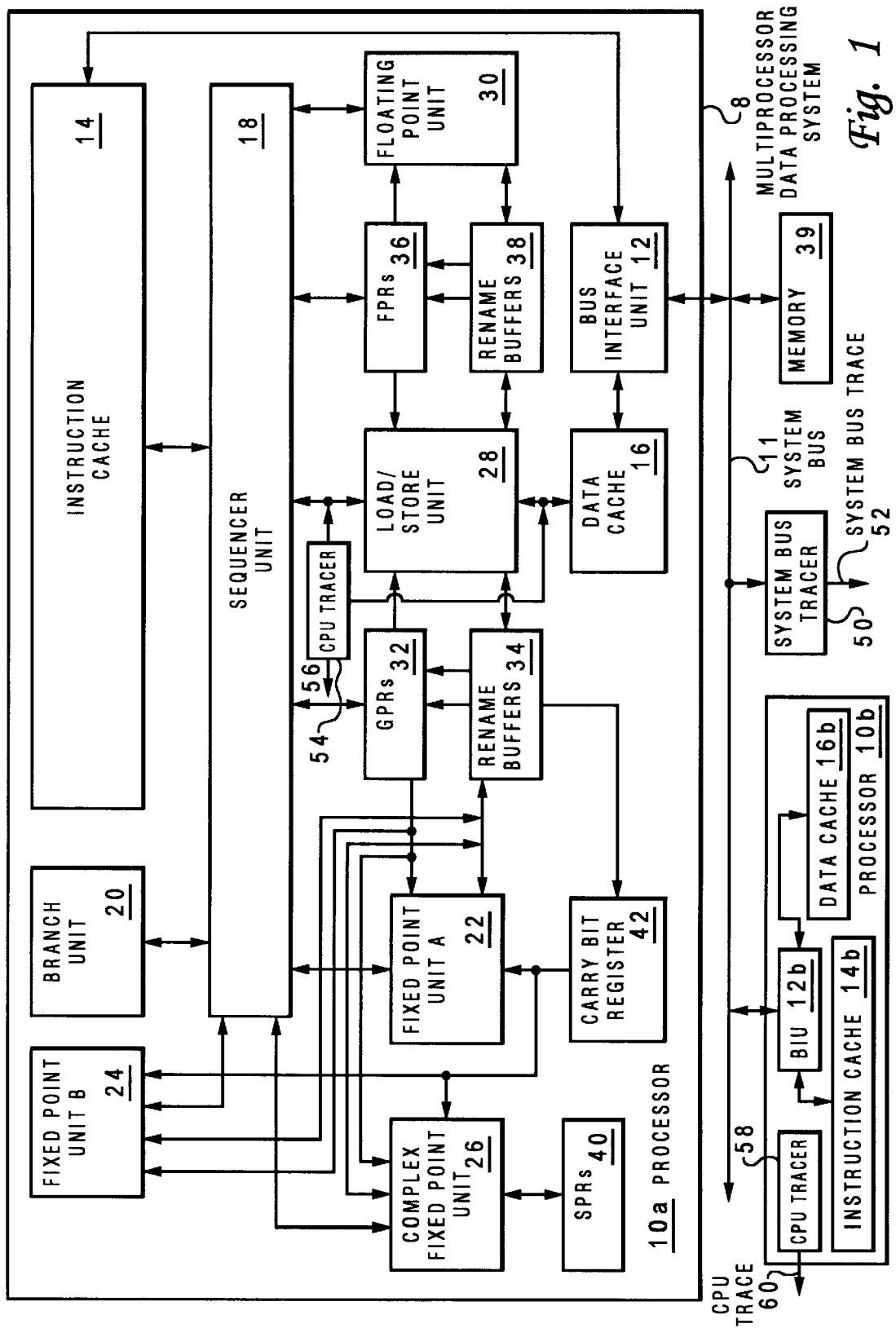
FIG. 1 depicts a pictorial representation of a multiprocessor data processing system 8 which may be utilized to implement the method and system of the present invention.

FIG. 1 depicts a pictorial representation of a multiprocessor data processing system 8 including a processor 10a and a processor 10b for processing information according to the preferred embodiment. Processor 10a and processor 10b are similar to each other and include like elements. In the preferred embodiment, processor 10a is a single integrated circuit superscalar microprocessor. Accordingly, as discussed further herein below, processor 10a includes various units, registers, buffers, memories, and other sections, all of which are formed by integrated circuitry. Also, in the preferred embodiment, processor 10a operates according to reduced instruction set computer ("RISC") techniques. As shown in FIG. 1, a system bus 11 is connected to a bus interface unit ("BIU") 12 of processor 10a. BIU 12 controls the transfer of information between processor 10a and system bus 11.

BIU 12 is connected to an instruction cache 14 and to a data cache 16 of processor 10a. Instruction cache 14 outputs instructions to a sequencer unit 18. In response to such instructions from instruction cache 14, sequencer unit 18 selectively outputs instructions to other execution circuitry of processor 10a.

In addition to sequencer unit 18, in the preferred embodiment the execution circuitry of processor 10a includes multiple execution units, namely a branch unit 20, a fixed point unit A ("FXUA") 22, a fixed point unit B ("FXUB") 24, a complex fixed point unit ("CFXU") 26, a load/store unit ("LSU") 28, and a floating point unit ("FPU") 30. FXUA 22, FXUB 24, CFXU 26, and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26, and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10a. In response to such instructions and signals, branch unit 20 outputs (to sequencer unit 18) signals indicating suitable memory addresses storing a sequence of instructions for execution by processor 10a. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches the instructions to selected ones of execution units 20, 22, 24, 26, 28, and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10a achieves high performance by processing multiple instructions simultaneously at various ones of execution units 20, 22, 24, 26, 28, and 30. Accordingly, each instruction is processed as a sequence of stages, each being executable in parallel with stages of other instructions. Such a technique is called "pipelining". In a significant aspect of the illustrative embodiment, an instruction is normally processed as six stages, namely fetch, decode, dispatch, execute, completion, and writeback.

In the fetch stage, sequencer unit 18 selectively inputs (from instructions cache 14) one or more instructions from one or more memory addresses storing the sequence of instructions discussed further hereinabove in connection with branch unit 20, and sequencer unit 18.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28, and 30 after reserving rename buffer entries for the dispatched instructions' results (destination operand information). In the dispatch stage, operand information is supplied to the selected execution units for dispatched instructions. Processor 10a dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10a is able to execute instructions out-of-order relative to their programmed sequence.

In the completion stage, sequencer unit 18 indicates an instruction is "complete". Processor 10a "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10a updates its architectural states in response to the particular instruction. Processor 10a processes the respective "writeback" stages of instructions in order of their programmed sequence. Processor 10a advantageously merges an instruction's completion stage and writeback stage in specified situations.

In the illustrative embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

Additional processors may be connected to multiprocessor system 8 utilizing system bus 11. In a preferred embodiment, a second processor 10b is connected to system bus 11 and shares main memory 39. Processor 10b is similar to processor 10a and includes elements similar to processor 10a shown within processor 10a in FIG. 1. Processor 10b includes bus interface unit 12b, data cache 16b, and instruction cache 14b, as well as elements which perform similarly to the remaining elements shown in processor 10a.

In accordance with an important feature of the present invention, all events occurring at a plurality of locations within multiprocessor system 8 are monitored during execution of a test program. The events are stored in the order in which they occurred. For purposes of the following discussion, it will be assumed that the test program is applied to multiprocessor system 8. However, those skilled in the art will recognize that the test program may be applied to either multiprocessor system 8 or a simulator which simulates multiprocessor system 8.

The test program is executed by multiprocessor system 8. During execution, events occurring at a plurality of locations are monitored to generate a plurality of traces. The traces obtained by monitoring events at a plurality of locations are stored and can be utilized to determine whether multiprocessor system 8 is operating properly.

For example, a system bus tracer 50 is utilized to monitor all events occurring on system bus 11. In this manner, system bus trace 52 is generated and includes all events occurring on system bus 11 during execution of the test program in the order in which the events occurred. System bus trace 52 includes all reads and writes from all processors to and from main memory 39 which occurred during the execution of the test program in the particular order that they occurred.

CPU tracer 54 is utilized to generate CPU trace 56, and CPU tracer 58 is utilized to generate CPU trace 60. A CPU trace includes events occurring at the particular CPU during execution of the test program. In a preferred embodiment, for a particular CPU, the CPU trace will include an indication of each instruction which was issued, completed, and performed utilizing the particular CPU, as well as the order in which each instruction was issued, completed, and performed.

An instruction is "issued" when it is dispatched by sequencer 18 to either the data cache 16 or memory 39 through load/store unit 28. An instruction is "completed" when it has executed and is at a stage where any exception will not cause the re-issuance of this instruction. For example, in a system utilizing precise interrupts, when an exception occurs, all completed instructions will be performed and all instructions that have been issued but not completed will be re-issued. A load instruction is "performed" when the value to be returned by a load can no longer be changed by a subsequent store to the same location by any processor. A store instruction is "performed" when any load from the same location written by the store returns the value currently stored.

Figure 2:
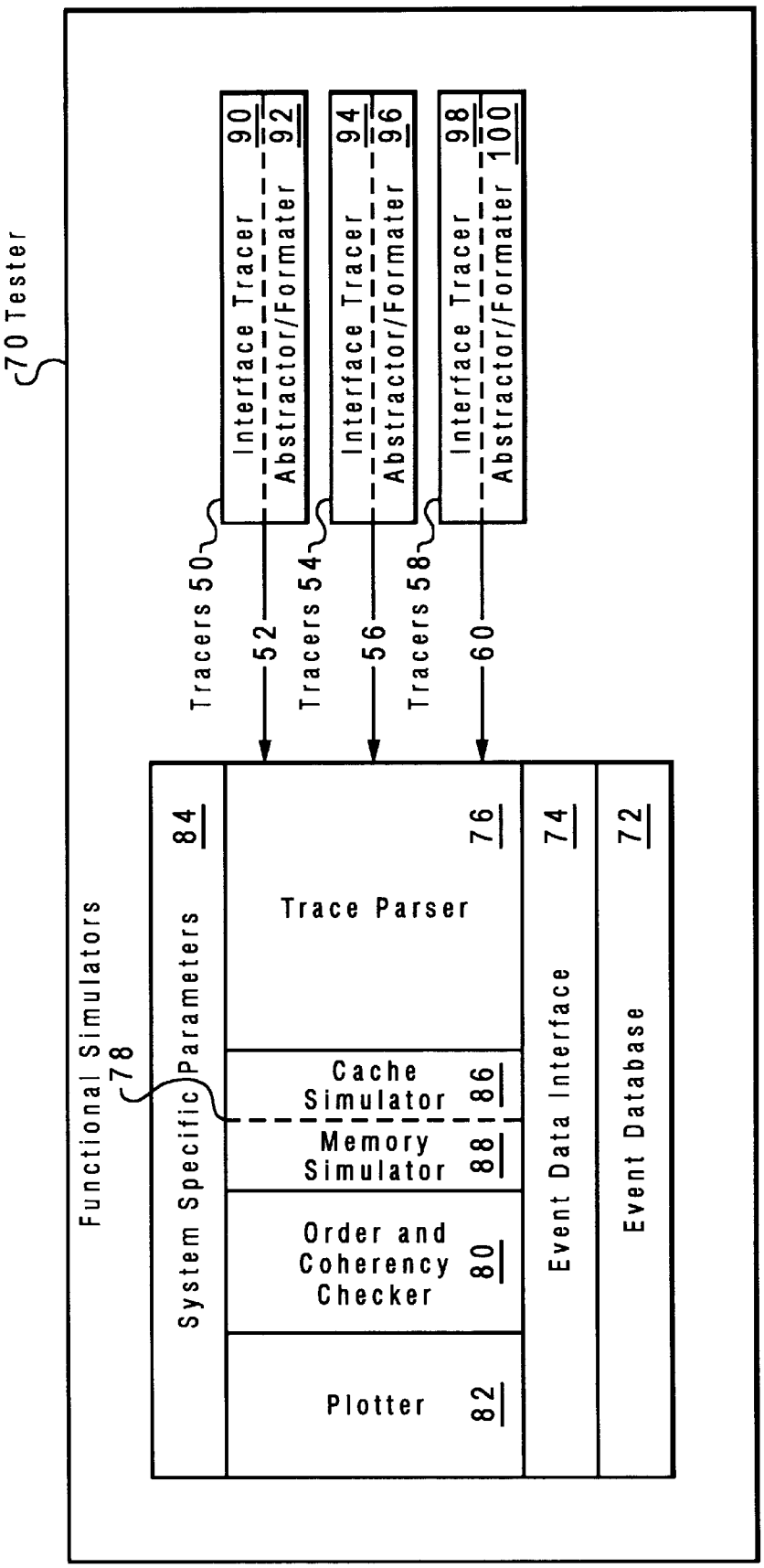
FIG. 2 illustrates a pictorial representation of a tester device 70 for testing multiprocessor data processing system 8 in accordance with the method and system of the present invention.

FIG. 2 is a pictorial representation of a tester 70 for testing multiprocessor data processing system 8 in accordance with the method and system of the present invention. Tester 70 includes a plurality of tracers 50, 54, and 58, an event database 72, an event data interface 74, a trace parser 76, functional simulators 78, order and coherency checker 80, a plotter 82, and system specific parameters 84. The functional simulators include a cache simulator 86 and a memory simulator 88.

Each tracer includes an interface tracer and an abstractor/formatter. System bus tracer 50 includes an interface tracer 90 and an abstractor/formatter 92. CPU tracer 54 includes an interface tracer 94 and an abstractor/formatter 96. CPU tracer 58 includes an interface tracer 98 and an abstractor/formatter 100.

The interface tracer is an interface between the abstractor/formatter and the multiprocessor system which monitors events at a particular location and provides those events to the abstractor/formatter. The interface tracer must be customized for the particular multiprocessor system under test. Each interface within a multiprocessor system has an associated low level protocol that defines a particular format for requests and responses for the particular multiprocessor system. Interfaces include an interface to a CPU or to a system bus. Therefore, the interface tracer must be customized to the protocol utilized by the particular interface so that events which occur at the interface may be monitored.

The abstractor/formatter abstracts events from the interface tracer in an original format from the interface tracer, and converts those events from their original format into a second format. The second format is associated with tester 70. Events must be in the second format in order to be processed further by tester 70.

Each event will include have associated parameters. For example, the following is a description of the parameters associated with an event in a preferred embodiment. Preferably, each event will include a tag, a type, a size, an address, data, a request status, a coherence status, an issue time, a completion time, and a performed time. Those skilled in the art will understand that only a subset of the parameters listed above may be included.

An event includes a request and its associated response. A request may, for example, be a request from a processor to memory 39 for a block of data. A response may, for example, be a response from memory 39 to a processor which includes data requested by the processor.

A "tag" is included with requests and responses. The tag is a unique identifier for the associated event and identifies the source and sequence number of the event. For example, the source may be either a processor or memory 39. The sequence number indicates where in a sequence of events the particular event is located. A request event may include a particular tag. The response associated with the request will also include the same particular tag in order to identify the association between the request and its response.

A "type" is associated with a request and identifies a type of the request. For example, a type may include a load or a store if the request is an event monitored at a CPU, or a read or a write if the request is an event monitored at the system bus.

A "size" is a size of the data associated with a request or response. An "address" is an address of a request. "Data" is the data returned on a load or store, or sent on a store or write. "Data" is associated with a request or response. "Request Status" includes a status of a response. For example, "request status" may indicate whether the operation was rejected or acknowledged by a device selected to process the request.

"Coherence Status" is used to indicate the current status of coherence for the associated response event. Other processors within the multiprocessor system use the coherence status in order to determine the state of data in the cache of those processors.

"Issue Time" is the time a request was issued. "Completion Time" is the time a response was completed. "Performed Time" is the time a response was performed.

Events and the parameters associated with those events are received by a trace parser 76. Trace parser 76 receives the events from all tracers including traces 52, 56, and 60 and then stores those events in an event database 72 utilizing event data interface 74.

Event database 72 includes all events monitored at all locations within multiprocessor system 8. The events are stored in event database 72 in a time-ordered sequence according to the time each event was issued. In this manner, the original program order sequence of the events is maintained. The events stored in event database 72 may be retrieved utilizing any of a number of parameters. For example, all events which are associated with a particular address may be obtained and copied from event database 72.

Event data interface 74 is a plurality of routines which are used to store and access entries within event database 72 where each entry represents an event. For example, event data interface 74 may be utilized to create, modify, or delete an entry within event database 72.

Functional simulators 78 include cache simulator 86 and memory simulator 88. Cache simulator 86 simulates the behavior of a single cache in a processor. Cache simulator 86 simulates loads and stores of data from a CPU, and applies cache reloads when appropriate.

Memory simulator 88 simulates reads and writes into memory 39. Memory simulator 88 provides data which is in memory both before and after a system bus event.

Order and coherency checker 80 includes a plurality of processes which are used to check for consistency and coherency of multiprocessor system 8. Examples of the plurality of processes which can be utilized are described below. Because these processes are independent of the other elements of tester 70, processes may be easily added or removed. Each event includes an associated error field within event database 72. When a process discovers an error, the error is logged in the error field associated with the event by the process within order and coherency checker 80 which discovered the error.

Figure 3:
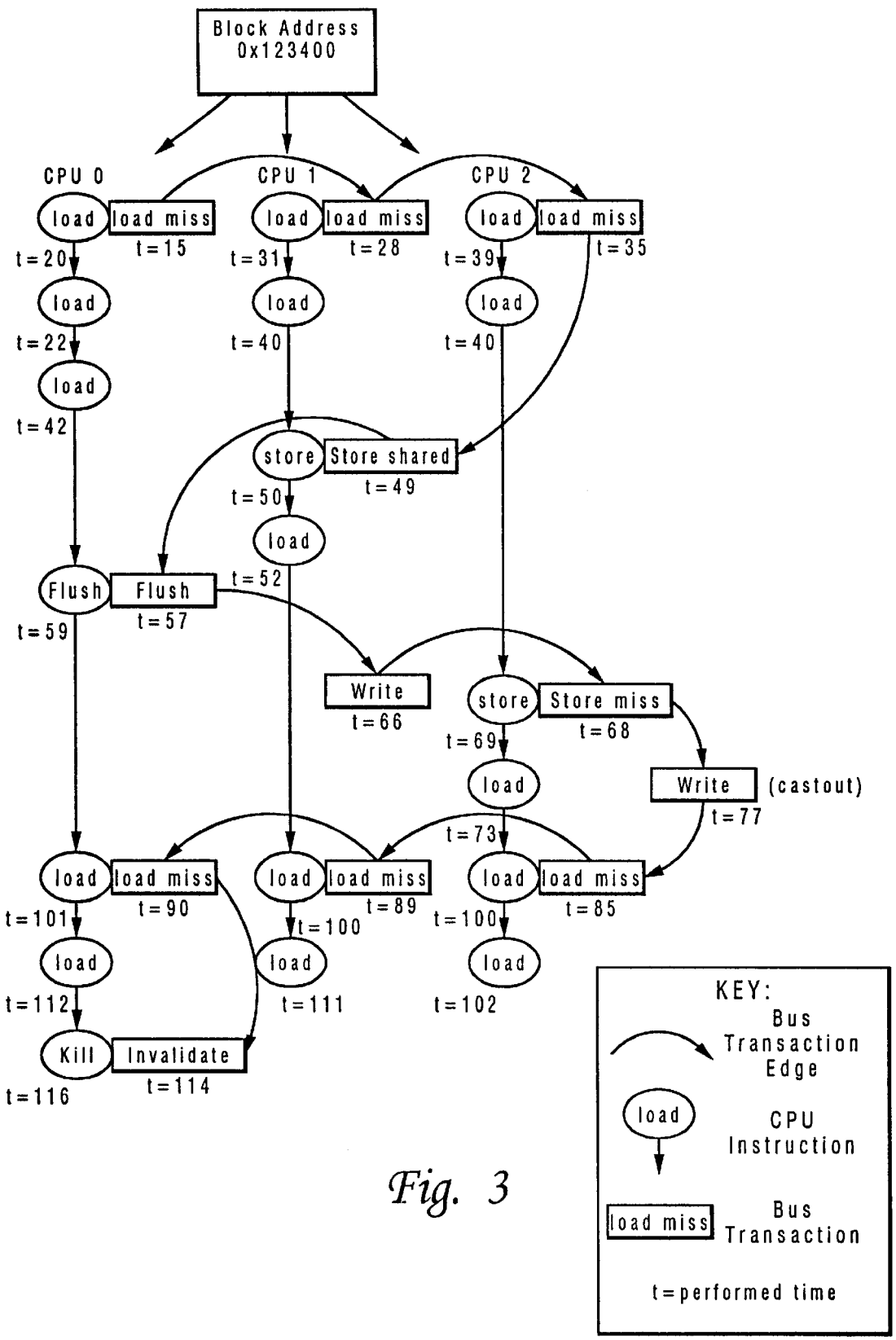
FIG. 3 depicts a pictorial representation of a plot of all events associated with a particular block address which occurred during the execution of a test program in accordance with the method and system of the present invention.

Plotter 82 generates a plot of a time-ordered sequence of events which are stored within event database 72. FIG. 3 is an example of a plot of a sequence of events associated with a particular block of data using the time each event was performed. In this manner, a visual depiction of the order of events is provided. A plot may be generated which uses the time each event was issued, completed, or performed.

FIG. 3 depicts a pictorial representation of a plot of all events associated with a particular block address which occurred during the execution of a test program in accordance with the method and system of the present invention. In the example depicted in FIG. 3, the multiprocessing system included three processors. All events associated with block address "0x123400" are depicted and ordered based on the time each event was performed. Processor 0 (CPU 0) attempted to load particular data from a cache associated with CPU 0. When the data was not located with the cache associated with CPU 0, a load miss occurred at t=15. The cache associated with CPU 0 was then loaded with data located at block "0x123400" at t=20. Thereafter, CPU 0 loaded data from its cache which was included within block "0x123400" at t=22. Next, CPU 1 attempted to load data from the cache associated with CPU 1. This data was not located within the cache associated with CPU 1 causing a load miss to occur at t=28. At t=31 the data was loaded from the cache associated with CPU 1.

This process continues until a list included all events associated with a particular block of data is generated. The list is generated by searching event database 72 for all events which were associated with the particular block of data.

Once all events are located which are associated with the particular block of data, copies of the events are ordered in accordance with a particular time. For example, copies of the events can be ordered in accordance with their issue time, completed time, or performed time. In this manner, a plurality of lists may be generated. A list may be generated for each block of data accessed during the test program. In addition, up to three lists may be generated as necessary for each block of data, one for each possible time period.

System specific parameters 84 include any specific parameters such as cache block size and flags which indicate whether a particular check should be enabled or disabled.

Figure 4A:
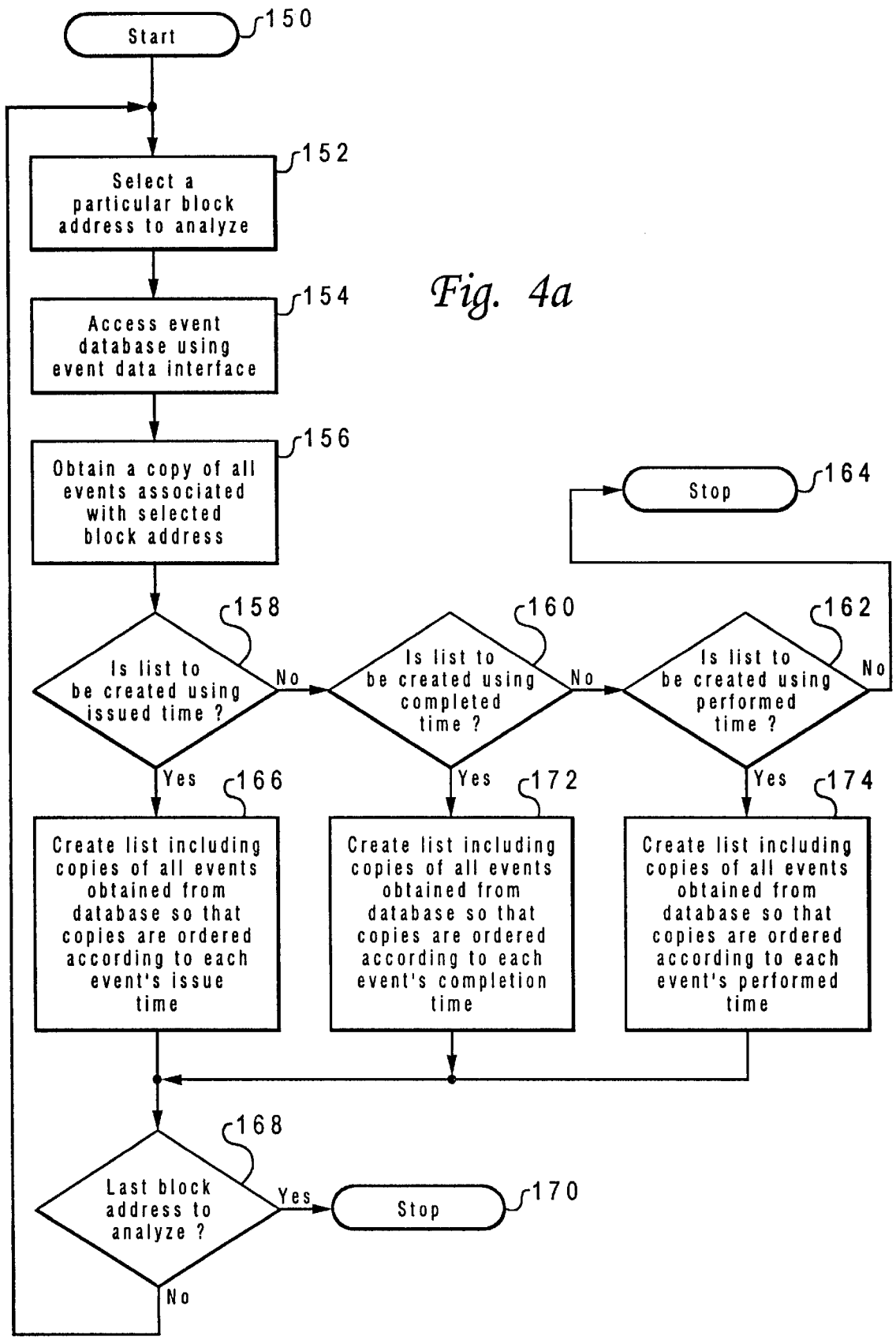
Figure 46:
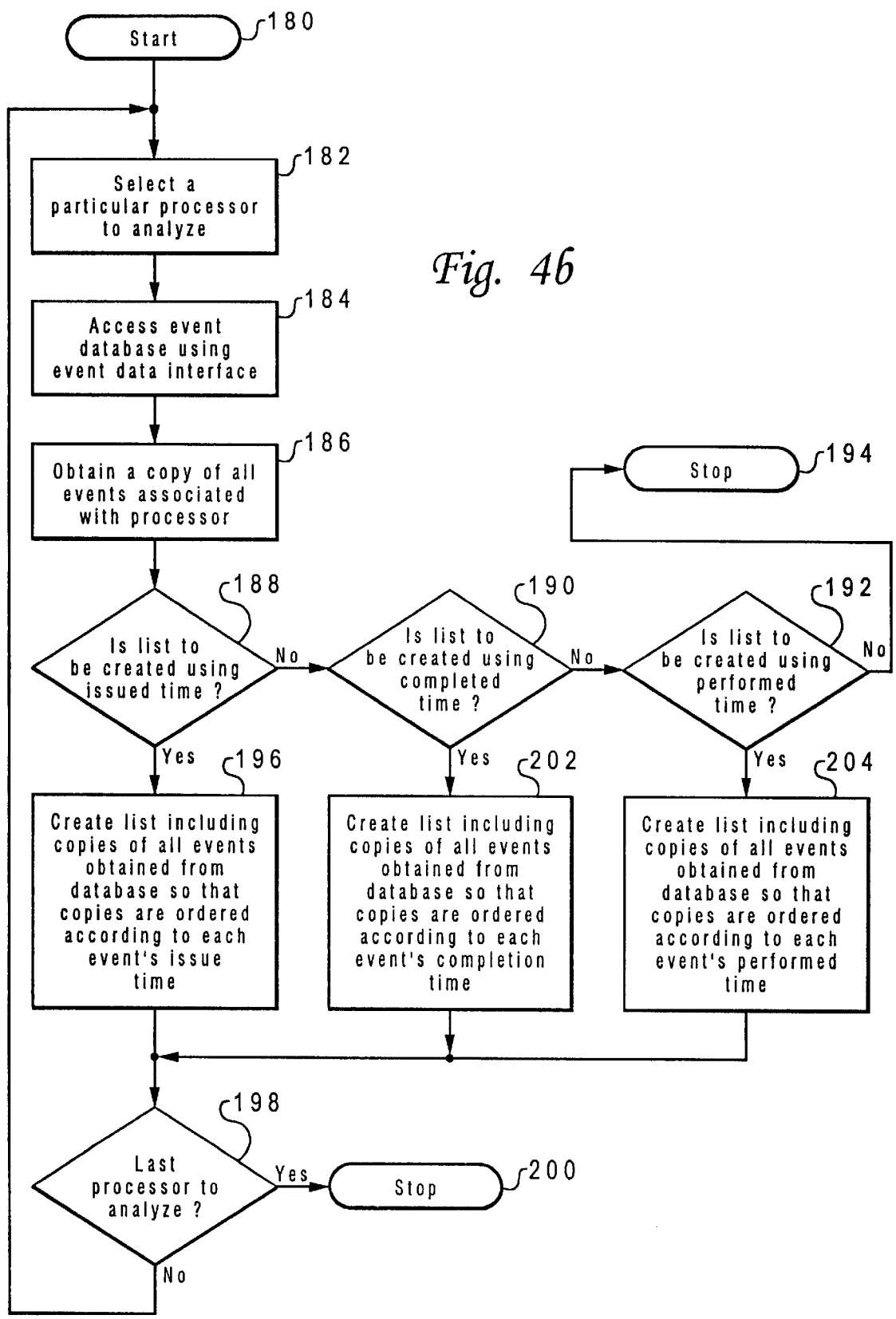
Figure 4C:
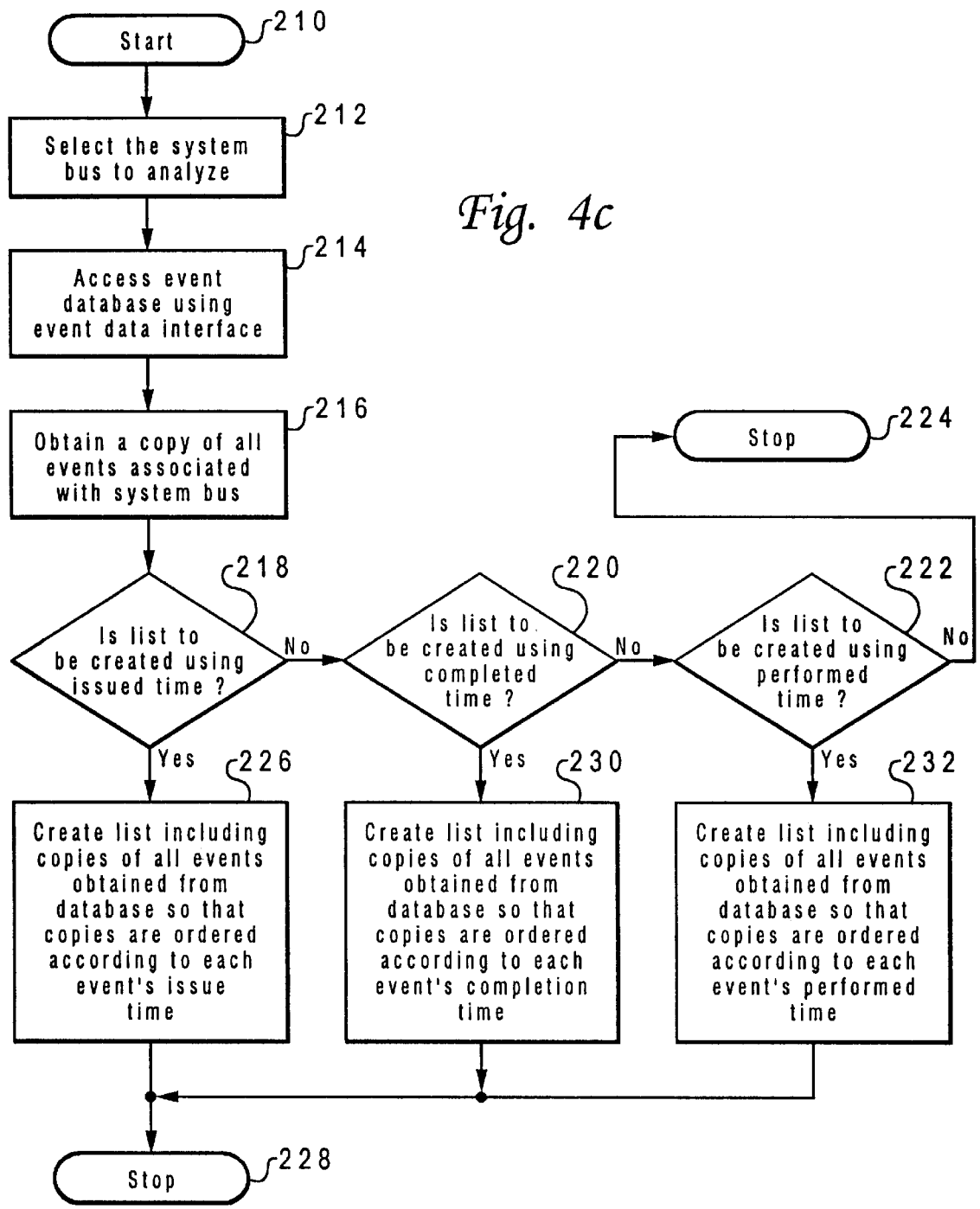

FIGS. 4a–4c are high level flow charts depicting the creation of a list of a sequence of events in accordance with the method and system of the present invention.

FIG. 4a is a high level flow chart depicting the creation of a list of a sequence of events which were associated with a particular block address. A list may be created for each block address. The process starts as depicted at block 150 and thereafter passes to block 152 which illustrates the selection of a particular block address to analyze. Next, block 154 depicts the accessing of event database 72 using event data interface 74. Thereafter, block 156 illustrates the obtaining of a copy of all events associated with the selected block address. Block 158 depicts a determination of whether or not the list is to be created using the issue time associated with each of the events. If a determination is made that the list is not to be created using the issue time associated with each of the events, the process passes to block 160 which illustrates a determination of whether or not the list is to be created using the completion time associated with each of the events. If a determination is made that the list is not to be created using the completion time associated with each of the events, the process passes to block 162 which illustrates a determination of whether or not the list is to be created using the performed time associated with each of the events. If a determination is made that the list is not to be created using the performed time associated with each of the events, the processes terminates as depicted by block 164.

Referring again to bock 158, if a determination is made that the list is to be created using the issue time, the process passes to block 166 which illustrates a creation of a list which includes a copy obtained from event database 72 of each event associated with this block address. The copies included within the list are ordered sequentially according to the issue time associated with each event. The process then passes to block 168 which illustrates a determination of whether or not this is the last block address to analyze. If a determination is made that this is the last block address to analyze, the process terminates as depicted by block 170. Referring again to block 168, if a determination is made that this is not the last block to be analyzed, the process passes back to block 152 so that another list may be created for each remaining block to be analyzed.

Referring again to block 160, if a determination is made that the list is to be created using the completion time, the process passes to block 172 which illustrates a creation of a list which includes a copy obtained from event database 72 of each event associated with this block address. The copies included within the list are ordered sequentially according to the completion time associated with each event. The process then passes to block 168.

Referring again to block 162, if a determination is made that the list is to be created using the performed time, the process passes to block 174 which illustrates a creation of a list which includes a copy obtained from event database 72 of each event associated with this block address. The copies included within the list are ordered sequentially according to the performance time associated with each event. The process then passes to block 168.

FIG. 4b is a high level flow chart depicting the creation of a list of a sequence of events which were monitored at a processor. For example, a list may be created for each processor within system 8. A list for a particular processor will include all events which occurred at the particular processor. The list will include all instructions associated with the particular processor, as well as a sequential order of instructions for the list. The sequence in which these instructions are listed may be either the order in which the instructions were issued, completed, or performed.

The process starts as depicted at block 180 and thereafter passes to block 182 which illustrates the selection of a particular processor to analyze. Next, block 184 depicts the accessing of event database 72 using event data interface 74. Thereafter, block 186 illustrates the obtaining of a copy of all events associated with the selected processor. Block 188 depicts a determination of whether or not the list is to be created using the issue time associated with each of the events. If a determination is made that the list is not to be created using the issue time associated with each of the events, the process passes to block 190 which illustrates a determination of whether or not the list is to be created using the completion time associated with each of the events. If a determination is made that the list is not to be created using the completion time associated with each of the events, the process passes to block 192 which illustrates a determination of whether or not the list is to be created using the performed time associated with each of the events. If a determination is made that the list is not to be created using the performed time associated with each of the events, the processes terminates as depicted by block 194.

Referring again to bock 188, if a determination is made that the list is to be created using the issue time, the process passes to block 186 which illustrates a creation of a list which includes a copy obtained from event database 72 of each event associated with this processor. The copies included within the list are ordered sequentially according to the issue time associated with each event. The process then passes to block 198 which illustrates a determination of whether or not this is the last processor to analyze. If a determination is made that this is the last processor to analyze, the process terminates as depicted by block 100. Referring again to block 198, if a determination is made that this is not the last processor to be analyzed, the process passes back to block 182 so that another list may be created for each processor to be analyzed.

Referring again to block 190, if a determination is made that the list is to be created using the completion time, the process passes to block 202 which illustrates a creation of a list which includes a copy obtained from event database 72 of each event associated with this processor. The copies included within the list are ordered sequentially according to the completion time associated with each event. The process then passes to block 198.

Referring again to block 192, if a determination is made that the list is to be created using the performed time, the process passes to block 204 which illustrates a creation of a list which includes a copy obtained from event database 72 of each event associated with this processor. The copies included within the list are ordered sequentially according to the performance time associated with each event. The process then passes to block 198.

FIG. 4c is a high level flow chart depicting the creation of a list of a sequence of events which were monitored at system bus 11. A list for system bus 11 will include all events which occurred on system bus 11. The list will include all reads and writes which occurred which were associated with any of the processors. The reads and writes in the list will be ordered in the sequence in which they occurred on system bus 11.

The process starts as depicted at block 210 and thereafter passes to block 212 which illustrates the selection of system bus 11 to analyze. Next, block 214 depicts the accessing of event database 72 using event data interface 74. Thereafter, block 216 illustrates the obtaining of a copy of all events associated with system bus 11. Block 218 depicts a determination of whether or not the list is to be created using the issue time associated with each of the events. If a determination is made that the list is not to be created using the issue time associated with each of the events, the process passes to block 220 which illustrates a determination of whether or not the list is to be created using the completion time associated with each of the events. If a determination is made that the list is not to be created using the completion time associated with each of the events, the process passes to block 222 which illustrates a determination of whether or not the list is to be created using the performed time associated with each of the events. If a determination is made that the list is not to be created using the performed time associated with each of the events, the processes terminates as depicted by block 224.

Referring again to bock 218, if a determination is made that the list is to be created using the issue time, the process passes to block 226 which illustrates a creation of a list which includes a copy obtained from event database 72 of each event associated system bus 11. The copies included within the list are ordered sequentially according to the issue time associated with each event. The process then terminates as depicted at block 228.

Referring again to block 220, if a determination is made that the list is to be created using the completion time, the process passes to block 230 which illustrates a creation of a list which includes a copy obtained from event database 72 of each event associated system bus 11. The copies included within the list are ordered sequentially according to the completion time associated with each event. The process then terminates as depicted at block 228.

Referring again to block 222, if a determination is made that the list is to be created using the performed time, the process passes to block 232 which illustrates a creation of a list which includes a copy obtained from event database 72 of each event associated with system bus 11. The copies included within the list are ordered sequentially according to the performance time associated with each event. The process then terminates as depicted at block 228.

Figure 5:
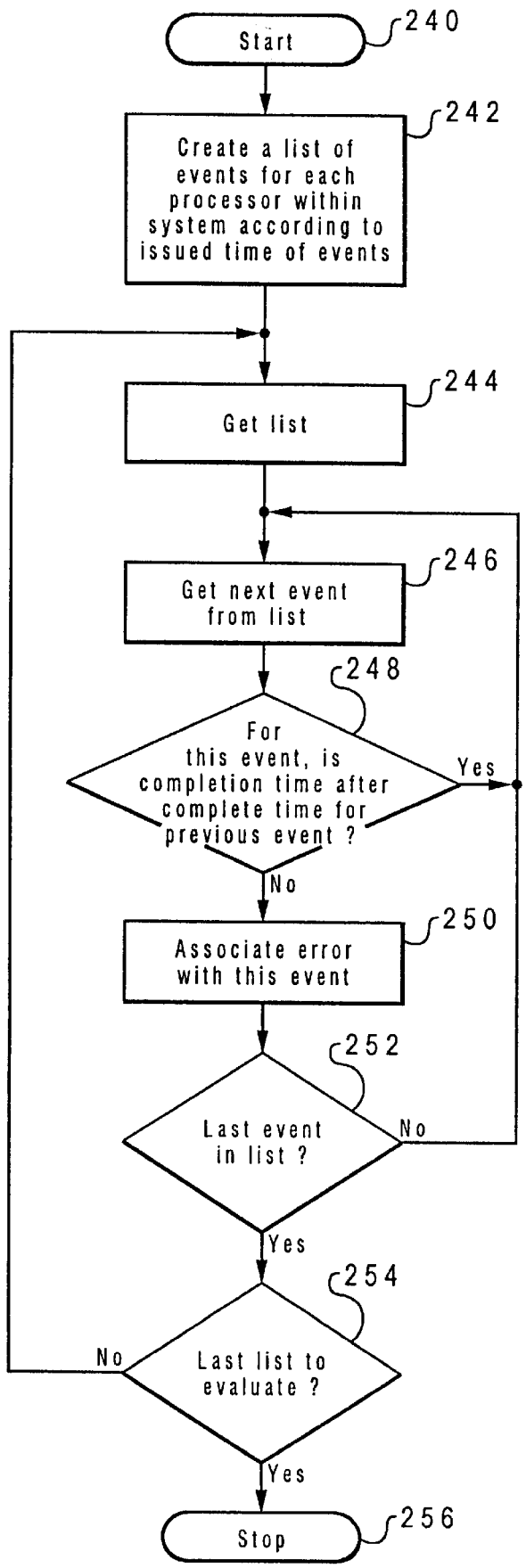
FIG. 5 is a high level flow chart illustrating a completion order check of multiprocessor system 8 in accordance with the present invention.

FIG. 5 is a high level flow chart illustrating a completion order check of multiprocessor system 8 in accordance with the present invention. The completion order check checks that all instructions from a processor have completed in program order. The process starts as depicted at block 240 and thereafter passes to block 242 which illustrates the creation of a list using the process described in FIG. 4b using the issued time of the events. Next, block 244 depicts getting the list created as illustrated by block 242. Thereafter, block 246 illustrates getting the next event from the list. Block 248 then depicts a determination of whether or not a completion time associated with this event is later in time than a completion time associated with the previous event. If a determination is made that a completion time associated with this event is later in time than a completion time associated with the previous event, the process passes to block 246. Referring again to block 248, if a determination is made that a completion time associated with this event is not later in time than a completion time associated with the previous event, the process passes to block 250 which depicts the association of an error with this event.

The process then passes to block 252 which illustrates a determination of whether or not this is the last event in the list. If a determination is made that this is not the last event in the list, the process passes back to block 246. If a determination is made that this is the last event in the list, the process passes to block 254 which depicts a determination of whether or not this is the last list to evaluate. If a determination is made that this is not the last list to evaluate, the process passes back to block 244. If a determination is made that this is the last list to evaluate, the process terminates as depicted at block 256.

Figure 6:
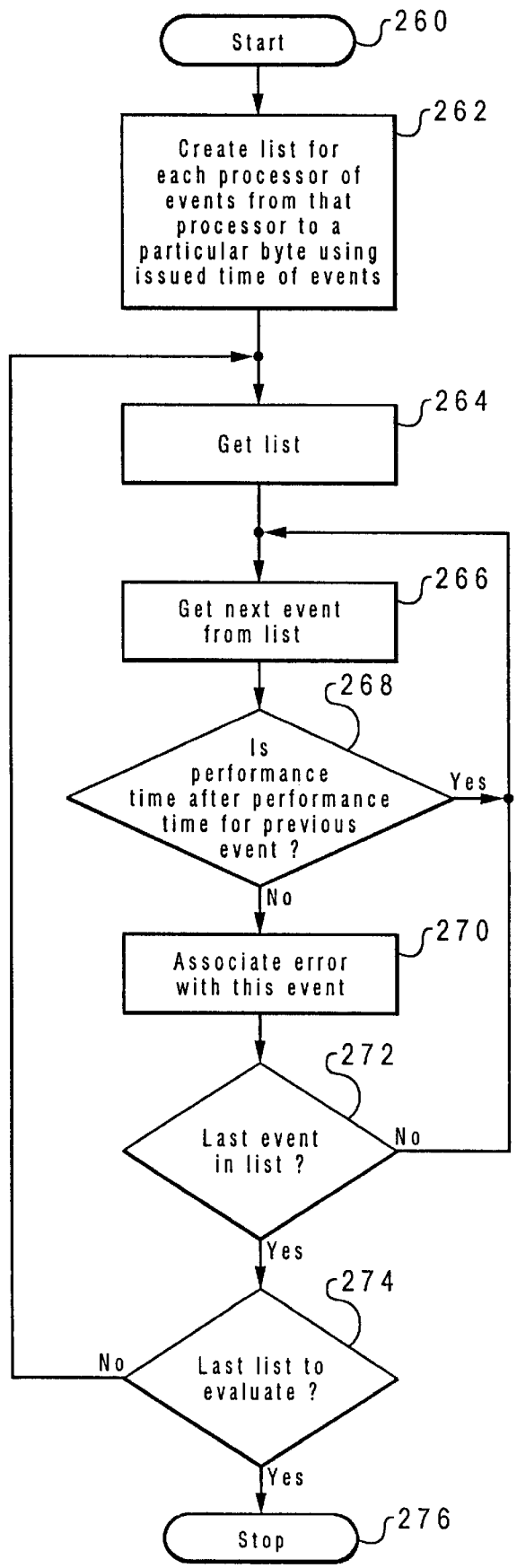
FIG. 6 is a high level flow chart depicting a collision order check of multiprocessor system 8 in accordance with the present invention.

FIG. 6 is a high level flow chart depicting a collision order check of multiprocessor system 8 in accordance with the present invention. The collision order check checks that all instructions from a processor to overlapping addresses complete and perform in the order of their issuance. The process starts as depicted at block 260 and thereafter passes to block 262 which illustrates the creation of a list for each processor of the events from that processor to a particular byte address using the issued time of the events. Next, block 264 depicts getting the list created as illustrated by block 262. Thereafter, block 266 illustrates getting the next event from the list. Block 268 then depicts a determination of whether or not a performance time associated with this event is later in time than a performance time associated with the previous event. If a determination is made that performance time associated with this event is later in time than a performance time associated with the previous event, the process passes to block 266. Referring again to block 268, if a determination is made that a performance time associated with this event is not later in time than an performance time associated with the previous event, the process passes to block 270 which depicts the association of an error with this event.

The process then passes to block 272 which illustrates a determination of whether or not this is the last event in the list. If a determination is made that this is not the last event in the list, the process passes back to block 266. If a determination is made that this is the last event in the list, the process passes to block 274 which depicts a determination of whether or not this is the last list to evaluate. If a determination is made that this is not the last list to evaluate, the process passes back to block 264. If a determination is made that this is the last list to evaluate, the process terminates as depicted at block 276.

Figure 7:
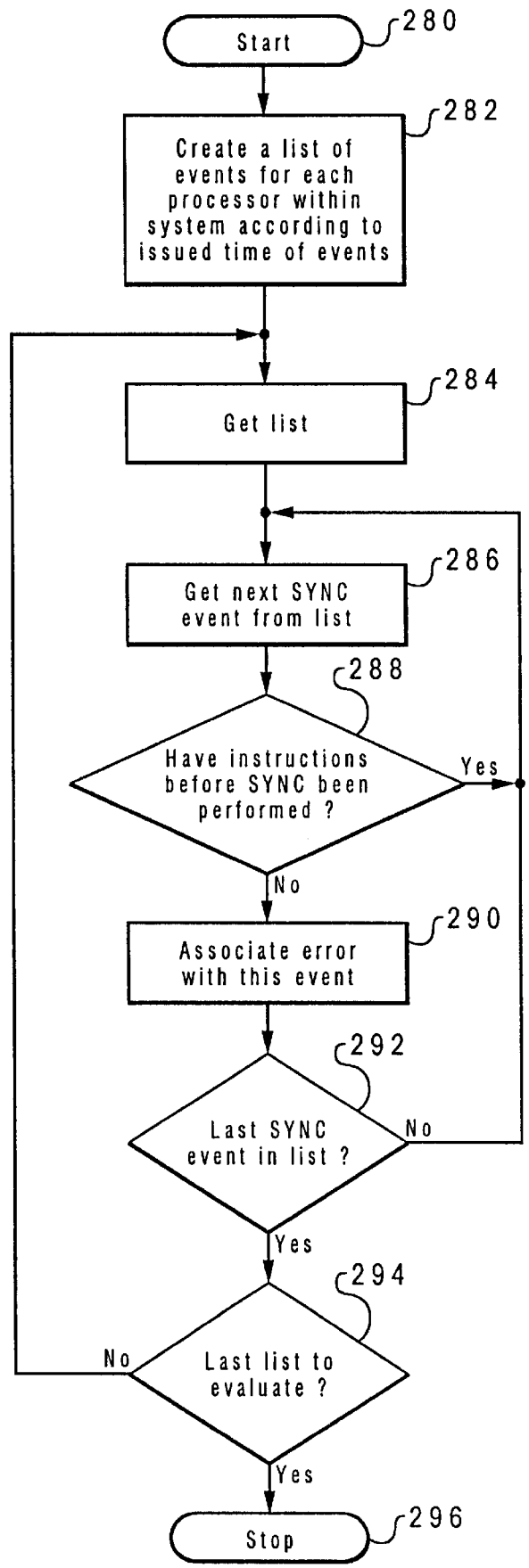
FIG. 7 is a high level flow chart illustrating a synchronization order check of multiprocessor system 8 in accordance with the present invention.

FIG. 7 is a high level flow chart illustrating a synchronization order check of multiprocessor system 8 in accordance with the present invention. The synchronization order is a check that all instructions in a CPU before the synchronization event perform before the synchronization event, and that all instructions after the synchronization event perform after the synchronization event. The process starts as depicted at block 280 and thereafter passes to block 282 which illustrates the creation of a list using the process described in FIG. 4b using the issued time of the events. Next, block 284 depicts getting the list created as illustrated by block 282. Thereafter, block 286 illustrates getting a synchronization event (SYNC) from the list. A synchronization event synchronizes the order of execution of instructions.

Block 288 then depicts a determination of whether or not the instructions before the SYNC event have been performed. If a determination is made that the instructions before the SYNC event have been performed, the process passes to block 286. Referring again to block 288, if a determination is made that the instructions before the SYNC event have not been performed, the process passes to block 290, the process passes to block 290 which depicts the association of an error with this event.

The process then passes to block 292 which illustrates a determination of whether or not this is the last SYNC event in the list. If a determination is made that this is not the last SYNC event in the list, the process passes back to block 286. If a determination is made that this is the last SYNC event in the list, the process passes to block 294 which depicts a determination of whether or not this is the last list to evaluate. If a determination is made that this is not the last list to evaluate, the process passes back to block 284. If a determination is made that this is the last list to evaluate, the process terminates as depicted at block 296.

Figure 8A:
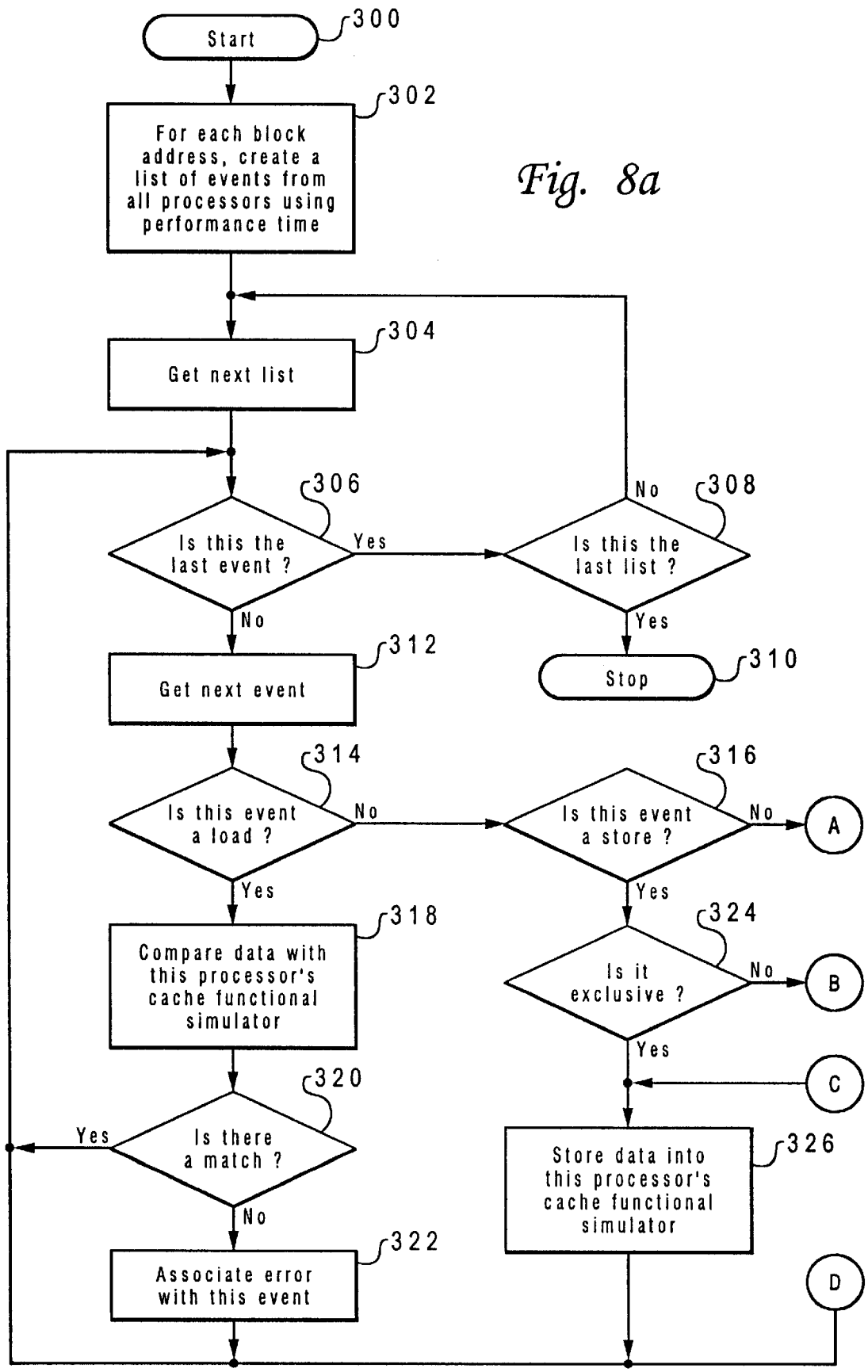
Figure 86:
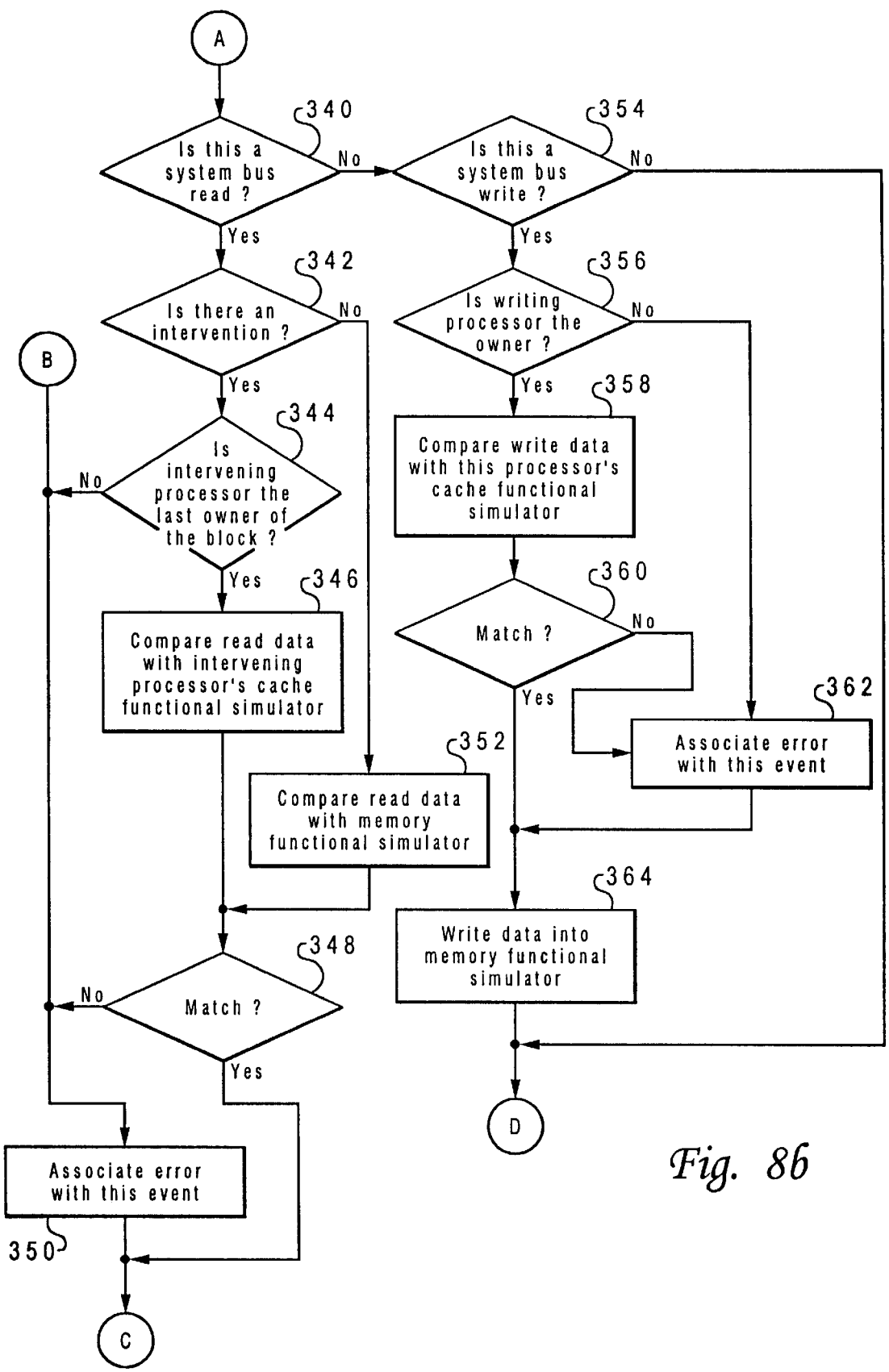

FIGS. 8a and 8b together are a high level flow chart depicting a check of loads, stores, reads, and writes within multiprocessor system 8 in accordance with the present invention.

The rule to be followed for cacheable loads is: "A load operation from a CPU can load a value last stored by itself to the location or one of the values subsequently stored from any other CPU to the same location as long as the stores from all of the CPUs are loaded in some sequential order." A load operation can load data it last stored to the location or data reloaded by one of the successive missed issued by its CPU to the same cache block. The successive miss must read data which is a sub-sequence of a sequence of store values to that location.

In order to verify that the multiprocessor is following this rule, the load and store operations are functionally simulated in a Cache Functional Simulator for each processor's cache. All load and store instructions to a particular cache block are applied to the functional simulator with appropriate cache reloads. For every load in the list, the current simulation cache is checked. If the data did not match, the subsequent system bus misses are searched by traversing the list until either a match occurs or the system bus transaction being matched has an issue time that is greater than the load operation's performed time. This is because a load event could not have obtained data from a miss which was issued after it performs.

The process described above uses store type instructions as passive functional simulation operations. A store-exclusivity check must be performed that confirms that all cacheable stores are performed after obtaining exclusivity. Cacheable stores from all CPUs to a particular storage location must be performed in sequential order. Using the write-invalidate protocol, stores to the same storage location must appear to be executing in sequential order with respect to all processors. Since coherence is maintained at the cache block level, all processors are required to obtain exclusive copies of the cache block before the CPU can perform store type operations on the block.

To obtain an exclusive copy, each processor must have successfully performed one of the following system bus operations before the store can be performed: (1) load miss—an exclusive copy loaded through a load miss from the storing processor, (2) store miss—exclusive copy loaded through a store miss from the storing processor, or (3) store shared—a request change from shared to exclusive state from the storing processor. Exclusivity may be lost due to several operations that are performed on the system bus, such as (1) load miss—load miss from another processor, (2) store miss—exclusive copy loaded through a store miss from another processor, (3) store shared—request change from shared to exclusive state from another processor, (4) write—write by another processor, or (5) invalidate—invalidate by any processor.

The process starts as depicted at block 300 and thereafter passes to block 302 which illustrates creating a list of a sequence of events. The list includes a copy of all events from all processors using performance time. A list is created for each block address.

Next, block 304 illustrates getting a next list. Thereafter, block 306 depicts a determination of whether or not this is the last event in the list. If a determination is made that this is the last event, the process passes to block 308 which depicts a determination of whether or not this is the last list. If a determination is made that this is not the last list, the process passes back to block 304. Referring again to block 308, if a determination is made that this is the last list, the process terminates as depicted a block 310.

Referring again to block 306, if a determination is made that this is not the last event, the process passes to block 312 which illustrates getting the next event. Next, block 314 depicts a determination of whether or not this event is a load event. If a determination is made that this event is not a load event, the process passes to block 316. Referring again to block 314, if a determination is made that this event is a load event, the process passes to block 318 which illustrates a comparison between the data associated with this processor's cache functional simulator and the data associated with this load event. Thereafter, block 320 illustrates a determination of whether or not there is a match. If a determination is made that there is a match, the process passes back to block 306. Referring again to block 320, if a determination is made that there is not a match, the process passes to block 322 which depicts the association of an error with this event. Thereafter, the process passes back to block 306.

Referring again to block 316, a determination is made regarding whether or not this event is a store event. If a determination is made that this event is a store event, the process passes to block 324 which depicts a determination of whether or not this was an exclusive copy of the data associated with this store event. Stores to the same address must appear to be executing in sequential order with respect to all processors. Therefore, all processors are required to obtain exclusive copies of the cache block before they can perform store operations on the block. If a determination is made that this was an exclusive copy of the data, the process passes to block 326 which illustrates storing data into this processor's cache functional simulator. Thereafter, the process passes back to block 306. Referring again to block 324, if a determination is made that this was not an exclusive copy of the data, the process passes to block 350 which illustrates the association of an error with this event. The process then passes back to block 326.

Referring again to block 316, if a determination is made that this event is not a store event, the process passes to block 340 which illustrates a determination of whether or not this event is a system bus read event. All reads and writes are coherent on the system bus if the block being read from or written to has one and only one source which last owned the block or modified some or all locations in the block.

If a determination is made that this is a system bus read, the process passes to block 342 which depicts a determination of whether or not there was an intervention. Typically, miss operations obtain data from memory or from another processor. When another processor provides the data, an intervention protocol is used for data transfer. An intervention occurs when one processor's cache contains a modified block of data and a second processor's cache requests to read it. While memory attempts to supply data for this request, the first processor intervenes and supplies the data from its cache.

When an intervention occurs, the miss data obtained by intervention is checked by determining the last exclusive access by the intervening processor, loading the last miss data in the Cache Functional Simulator, and simulating stores performed by the intervening processor up to the point of the intervention. The simulated data is then compared with the miss data.

When memory supplies the data, it must be ensured that no other processor holds a modified copy of the data and that the data supplied by memory matches the value in memory. The memory data is verified by functionally simulating all writes into memory up to the miss operation using the Memory Functional Simulator. To verity if any processor modified that data before the miss, the coherence state of the block is functionally simulated up to the miss in the Memory Functional Simulator. The data is valid if both the state and data are consistent with the functional simulation.

Referring again to block 342, if a determination is made that there was not an intervention, the process passes to block 344 which illustrates a determination of whether or not the intervening processor was the last owner of the block. If a determination is made that the intervening processor was not the last owner of the block, the process passes back to block 350. Referring again to block 344, if a determination is made that the intervening processor was the last owner of the block, the process passes to block 346, which illustrates a comparison of the read data with the intervening processor's cache functional simulator. Next, block 348, depicts a determination of whether or not there was a match. If a determination is made that there was not a match, the process passes back to block 350. If a defemination is made that there was a match, the process passes back to block 326.

Referring again to block 342, if a determination is made that there was not an intervention, the process passes to block 352 which illustrates a comparison of the read data with the memory functional simulator. Thereafter the process passes to block 348.

Referring again to block 340, if a determination is made that this is not a system bus read, the process passes to block 354 which depicts a determination of whether or not this is a system bus write event. If a determination is made that this is not a system bus write event, the process passes back to block 306. Referring again to block 354, if a determination is made that this is a system bus write event, the process passes to block 356, which illustrates a determination of whether or not the writing processor is the owner. If a determination is made that the writing processor is the owner, the process passes to block 358 which illustrates a comparison of the write data with this processor's cache functional simulator. Next, block 360 illustrates a determination of whether or not there was a match. If a determination is made that there was a match, the process passes to block 364 which depicts writing the data into the memory functional simulator. The process then passes back to block 306.

Referring again to block 360, if a determination is made that there was not a match, the process passes to block 362 which depicts associating an error with this event. The process then passes to block 364. Referring again to block 354, if a determination is made that this is not a system bus write event, the process passes back to block 306.

Figure 9:
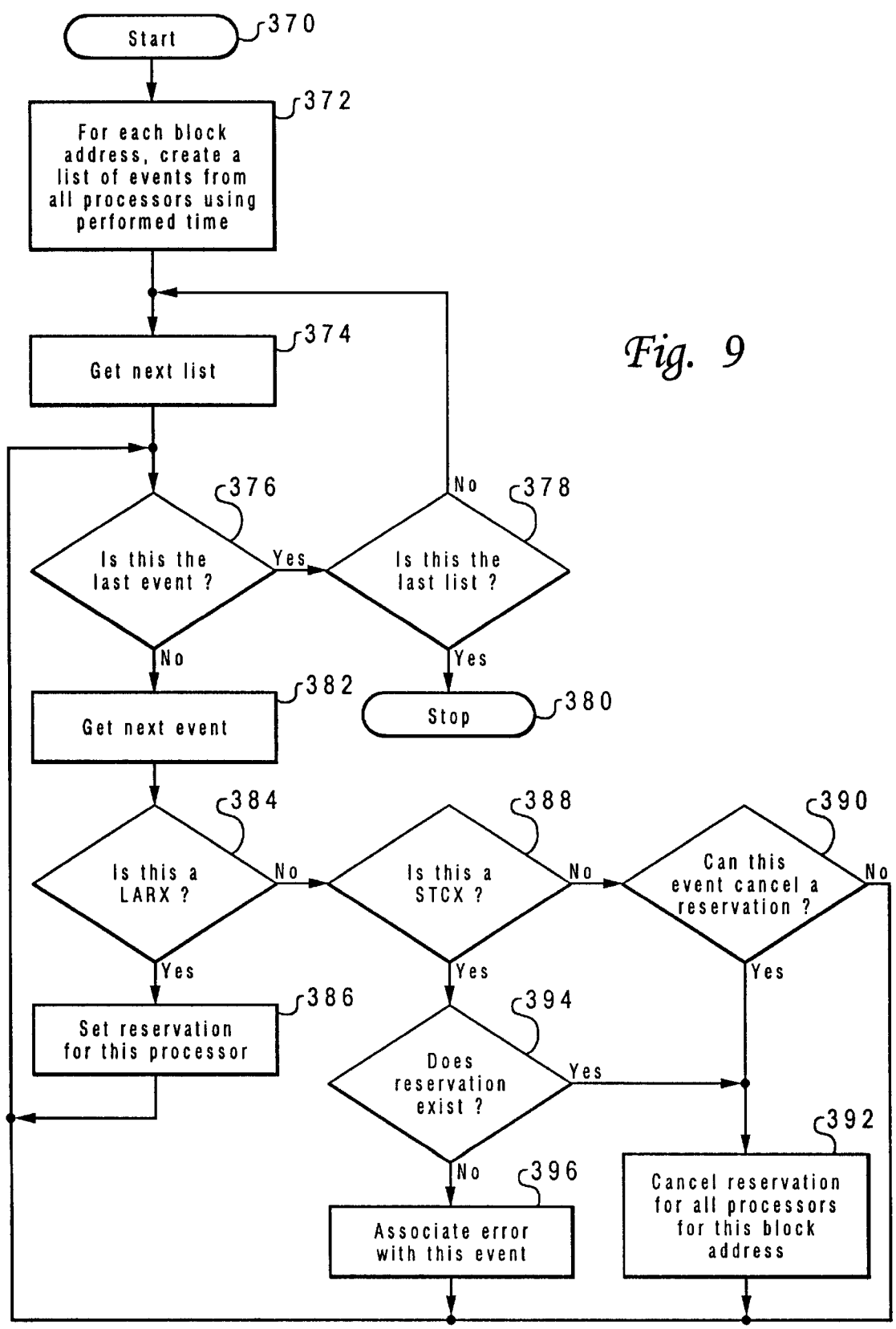
FIG. 9 is a high level flow chart illustrating checking mutual exclusion within multiprocessor system 8 in accordance with the present invention.

FIG. 9 is a high level flow chart illustrating checking mutual exclusion within multiprocessor system 8 in accordance with the present invention.

An acquire instruction in a POWER PC, a trademark of International Business Machines Corporation for a computer architecture, is performed through a reservation mechanism. The acquire uses LARX and STCX instructions to obtain a lock. When a LARX instruction performs, it loads a lock value from a location and establishes a reservation. If the lock is free, it attempts to lock it by a subsequent store (STCX) to the same location. The STCX will succeed, or lock, and store the value only if a reservation exists at the time the STCX operation is performed. If the reservation is cancelled, the STCX will fail to store the value. Therefore, in a window of LARX and STCX instructions to the same reservation cache block from one or more CPUs, only one CPU's STCX may be successful.

A reservation may be cancelled by a store or successful STCX from another processor, or a STCX from the processor that established the reservation. A LARX followed by another LARX instruction from the same CPU will cancel the previous reservation and re-establish a new one. As a result, during context switches, the operating system will force the reservation to be cancelled.

Mutual exclusion is checked by maintaining a reservation flag and address for each processor. When a LARX instruction is performed, the reservation flag and address are set for each processor. When a STCX operation succeeds, the following functions are performed: (1) If a reservation exists, cancel reservations on all processors which have reservation for this address, and (2) If the processor had lost its reservation due to a competing store or STCX operation, flag an error.

The process starts as depicted at block 370 and thereafter passes to block 372 which illustrates the creation of a list of events from all processors using the performed time for each block address. Next, block 372 depicts getting the next list. Thereafter, block 376 illustrates a determination of whether or not this is the last event. If a determination is made that this is the last event, the process passes to block 378 which depicts a determination of whether or not this is the last list. If a determination is made that this is not the last list, the process passes back to block 374. If a determination is made that this is the last list, the process terminates as depicted at block 380.

Referring again to block 376, if a determination is made that this is not the last event, the process passes to block 382 which illustrates getting the next event. Thereafter, block 384 illustrates a determination of whether or not his is a load and reserve word (LARX) event. If a determination is made that this is a LARX event, the process passes to block 386 which illustrates setting the reservation for this processor. Thereafter, the process passes back to block 376.

Referring again to block 384, if a determination is made that this is not a LARX event, the process passes to block 388 which illustrates a determination of whether or not this is a store word on condition (STCX) event. If a determination is made that this is a STCX event, the process passes to block 394 which illustrates a defemination of whether or not a reservation exists. If a determination is made that a reservation exists, the process passes to block 392 which illustrates the canceling of the reservation for all processors for this block address. The process then passes to block 376.

Referring again to block 394, if a determination is made that a reservation does not exist, the process passes to block 396 which depicts the association of an error with this event. The process then passes to block 376.

Referring again to block 388, if a determination is made that this is not a STCX event, the process passes to block 390 which depicts a determination of whether or not this event can cancel a reservation. If a determination is made that this event cannot cancel a reservation, the process passe to block 376. Referring again to block 390, if a determination is made that this event can cancel a reservation, the process passes to block 392.

While the invention has been particularly shown and described with reference to a preferred embodiment, it will be understood by those skilled in the art that various changes in form and detail may be made therein without departing from the spirit and scope of the invention.

We claim:

1. A method for testing a multiprocessor data processing system, said multiprocessor system including a shared main memory and a plurality of processors connected to said shared memory utilizing a system bus wherein data is transferred utilizing said system bus, a first processor of said plurality of processors including a cache coupled to said first processor of said plurality of processors, and a second processor of said plurality of processors including a cache coupled to said second processor of said plurality of processors, said method comprising the steps of:

said multiprocessor system executing a test program;

during said execution, generating a first trace by monitoring all events occurring at a first location within said multiprocessor system, each of said events including an associated time of occurrence, said first trace including an indication of each of said events and including said associated time for each of said events;

during said execution, generating a second trace by monitoring all events occurring at a second location within said multiprocessor system, each of said events including an associated time of occurrence, said second trace including an indication of each of said events and including said associated time for each of said events;

storing said first and said second traces in a database; and utilizing said first and said second traces to determine if said multiprocessor system is operating correctly.

2. The method according to claim 1 wherein said first location is a location at said system bus.

3. The method according to claim 2 wherein said second location is a location at said first processor of said plurality of processors.

4. The method according to claim 3 further comprising during said execution, generating a third trace by monitoring all events occurring at a third location within said multiprocessor system, each of said events including an associated time of occurrence, said third trace including an indication of each of said events and including said associated time for each of said events.

5. The method according to claim 4 wherein said third location is a location at said second processor of said plurality of processors.

6. The method according to claim 5 wherein each of said events includes a request and a response, said request including a plurality of associated times and said response including a plurality of associated time.

7. The method according to claim 6 further comprising the steps of:

accessing said database to obtain copies of events associated with a particular time;

generating a list of a first plurality of events associated with said particular time, wherein said first plurality of events include events monitored at said first and said second locations, said first plurality of events included within said list in a particular sequence, where said particular sequence indicates an order in which said plurality of events were monitored; and utilizing said list to determine if said multiprocessor system is operating correctly.

8. A testing device system for testing a multiprocessor data processing system, said multiprocessor system including a shared main memory and a plurality of processors connected to said shared memory utilizing a system bus wherein data is transferred utilizing said system bus, a first processor of said plurality of processors including a cache coupled to said first processor of said plurality of processors, and a second processor of said plurality of processors including a cache coupled to said second processor of said plurality of processors, comprising:

means for said multiprocessor system executing a test program;

means for during said execution, generating a first trace by monitoring all events occurring at a first location within said multiprocessor system, each of said events including an associated time of occurrence, said first trace including an indication of each of said events and including said associated time for each of said events;

means for during said execution, generating a second trace by monitoring all events occurring at a second location within said multiprocessor system, each of said events including an associated time of occurrence, said second trace including an indication of each of said events and including said associated time for each of said events;

means for storing said first and said second traces in a database; and means for utilizing said first and said second traces to determine if said multiprocessor system is operating correctly.

9. The system according to claim 8 wherein said first location is a location at said system bus.

10. The system according to claim 9 wherein said second location is a location at said first processor of said plurality of processors.

11. The system according to claim 10 further comprising during said execution, generating a third trace by monitoring all events occurring at a third location within said multiprocessor system, each of said events including an associated time of occurrence, said third trace including an indication of each of said events and including said associated time for each of said events.

12. The system according to claim 11 wherein said third location is a location at said second processor of said plurality of processors.

13. The system according to claim 12 wherein each of said events includes a request and a response, said request including a plurality of associated times and said response including a plurality of associated time.

14. The system according to claim 13 further comprising:

means for accessing said database to obtain copies of events associated with a particular time;

mean for generating a list of a first plurality of events associated with said particular time, wherein said first plurality of events include events monitored at said first and said second locations, said first plurality of events included within said list in a particular sequence, where said particular sequence indicates an order in which said plurality of events were monitored; and means for utilizing said list to determine if said multiprocessor system is operating correctly.

* * * * *